United States Patent [19]

Kuratsuji et al.

[11] Patent Number: 6,063,505

[45] Date of Patent: May 16, 2000

[54] PLASTIC FILMS

[75] Inventors: Takatoshi Kuratsuji; Jerome Maillet, both of Kyoto-fu; Jun Yamamoto, Tokyo, all of Japan

[73] Assignee: Elf Atochem S.A., France

[21] Appl. No.: 08/842,520

[22] Filed: Apr. 24, 1997

[30] Foreign Application Priority Data

Apr. 24, 1996 [JP] Japan .................................... 8-102103

[51] Int. Cl.$^7$ ...................................... B32B 27/00
[52] U.S. Cl. .......................... 428/516; 428/515; 428/213; 428/220; 428/475.8; 428/476.1; 428/476.3; 428/476.9
[58] Field of Search ..................... 428/213, 220, 428/475.8, 476.1, 476.3, 515, 516, 520, 476.9

[56] References Cited

U.S. PATENT DOCUMENTS

| | | | |
|---|---|---|---|
| 4,609,688 | 9/1986 | Radisch et al. | 523/169 |
| 4,739,012 | 4/1988 | Hagman | 525/92 |
| 4,789,720 | 12/1988 | Teffenhart | 528/76 |
| 5,532,053 | 7/1996 | Mueller | 428/287 |
| 5,686,173 | 11/1997 | Fujii et al. | 428/213 |
| 5,698,249 | 12/1997 | Hayashi et al. | 426/106 |

FOREIGN PATENT DOCUMENTS

| | | |
|---|---|---|
| 369092 | 5/1990 | European Pat. Off. . |
| 560630 | 9/1993 | European Pat. Off. . |
| 56-45419 | 4/1981 | Japan . |

OTHER PUBLICATIONS

European Search Report dated Jul. 30, 1997.
ASTM E–96—Information Sheet.

*Primary Examiner*—Charles Nold

[57] ABSTRACT

The object of the present invention lies in offering plastic film having a suitable degree of moisture permeability and low water droplet adhesion.

Plastic film which is characterized in that, in plastic film of moisture permeability, as prescribed in JIS Z0208, of less than 1000 g/m$^2$/24 h, there is lamination with a film of moisture permeability at least 1000 g/m$^2$/24 h.

5 Claims, No Drawings

PLASTIC FILMS

FIELD OF THE INVENTION

The present invention relates to plastic film. The objective of the invention lies in providing a film which exhibits little fogging due to adhering water droplets even when kept at low temperature and high humidity.

BACKGROUND OF THE INVENTION

Film with a variety of functions is already widely known. In particular, in the field of packaging for foodstuffs and plants such as flowers, etc, a suitable degree of moisture permeability and of transparency are demanded from the point of view of preservation and appearance. Thus, if the moisture permeability is too great then the contents will dry-out whereas, conversely, if the moisture permeability is too low then moisture collects inside and, when the contents comes into contact therewith, rotting or spoiling occurs. Furthermore, when kept at low temperatures in a refrigerator, or the like, the moisture condenses and forms water droplets, which adhere to the film, making the contents hard to see and becoming a cause of spoilage. For the purposes, in particular, of preventing the adhesion of water droplets, hydrophilic materials such as fatty acid esters or ethylene oxide adducts have been incorporated in or applied to the film surface or, alternatively, a treatment has been carried out to raise the water repellency so that even when water droplets are formed they fall away.

However, these techniques suffer from the disadvantage that the surface is made sticky or the incorporated material oozes out, which is unsatisfactory as a commercial product, and so a drying stage is required after the application, and this entails costs. The present invention offers an antifogging film which does not require such application or drying, and which can be obtained merely by coextrusion or lamination.

DESCRIPTION OF THE INVENTION

The present invention is a plastic film which is characterized in that, in plastic film of moisture permeability, as prescribed in JIS Z0208, of less than 1000 g/m$^2$/24 h, there is lamination or coextrusion with a film of moisture permeability at least 1000 g/m$^2$/24 h; furthermore, the invention also comprises the aforesaid plastic film, characterized in that the film materials are at least one type selected from the group consisting of polyether-polyamide block copolymers, thermoplastic polyester elastomers and thermoplastic polyurethanes.

In the present invention, the "moisture permeability" is the value measured under conditions B (40° C., 90% relative humidity) by the method prescribed in JIS Z0208.

In the present invention, "plastic film" (or first plastic film layer) applies to film of moisture permeability less than 1000 g/m$^2$/24 h. In the case of film with a value of 1000 g/m$^2$/24 h or more, there is little water droplet adhesion, and so the present invention is not required. Preferably, the value lies in the range 10 to 900, and more preferably in the range 50 to 800 g/m$^2$/24 h.

The plastic film of (or first plastic film layer) the present invention is a laminate with film of moisture permeability at least 1000 g/m$^2$/24 h. In regard to the lamination method, conventionally-known methods can be employed such as the coextrusion method where both components are simultaneously extruded, the so-called extrusion lamination method where one component is first extruded in the form of film and then the other resin extruded on top, or the method whereby two films are hot pressure-bonded.

The resins from which the film of the present invention is constructed may be of any kind providing they have the aforesaid properties but, from the point of view of moisture permeability, it is preferred that they comprise at least one type selected from the group consisting of polyether-polyamide block copolymers, thermoplastic polyester elastomers and thermoplastic polyurethanes.

In the present invention, "polyether-polyamide block copolymers (abbreviated below to PEBA)" are polymers in which poly(oxyalkylene) chains (a), and polyamide chains (b) comprising polymers of aminocarboxylic acids or lactams with 6 or more carbons or polymers of salts of dicarboxylic acids and diamines with 6 or more carbons, are linked together. Those in which (a) and (b) are linked together via a dicarboxylic acid (c) with from 4 to 20 carbons are generally referred to as polyetheresteramides. These polymers are, for example, produced by the method of Japanese Examined Patent Publication No. 56-45419. Specifically, they are exemplified by Pebax (Elf Atochem Co.), ELY (Ems Co.) and VESTAMID (Hüls Co.). The type and amount of the polyamide component and of the polyether component in the PEBA used in the present invention will be selected according to the objective and the application.

In the present invention, "thermoplastic polyester elastomer (abbreviated below to TPEE)" are polymers in which poly(oxyalkylene) chains (a), or aliphatic polyester chains (a'), and polyester chains (c), which are polymers of hydroxycarboxylic acids with 6 or more carbons, or of aromatic dicarboxylic acids and dihydroxy compounds with 2 or more carbons, are linked together. Further, there may also be jointly used two or more types of the (c) component. This polymer is described in detail in, for example, U.S. Pat. No. 4,739,012. Specifically, they are exemplified by Hytrel (DuPont), Pelprene (Toyobo) and Rekuse (Teijin), etc. The weight ratio of the aforesaid (a) and/or (a') component to the (b) {sic} component in the TPEE used in the present invention will be determined by the objective and application.

In the present invention, as examples of the "thermoplastic polyurethane (abbreviated below to TPU)", there are polyether urethanes and polyester urethanes (adipate type, caprolactone type). Specifically, they are polyurethanes which are normally obtained by the reaction of an organic diisocyanate and a polyether or polyester diol of molecular weight in the range 500 to 6000, with chain extension sometimes being conducted in the present of a catalyst. As the isocyanate, there is preferably used toluylene diisocyanate, diphenylmethane diisocyanate or the like; as the polyether, there is preferably used polyoxytetramethylene, polyoxypropylene or the like; and as the polyester, there is preferably used {poly} butylene adipate or {poly} caprolactone, etc.

In the present invention, providing the moisture permeability lies within the aforesaid range, the PEBA, TPEE and TPU may used either on their own or as mixtures or, in the case of block copolymers, there may be used a mixture of two or more such polymers in which the soft segment/hard segment ratio of the respective resins differs, or again there may be employed blends with other resins.

In the plastic film of the present invention, there can be freely included, within a range that does not impair the properties of the film of the present invention, conventional antioxidants, thermal decomposition preventives, UV absorbers, hydrolysis-resisting modifiers, colouring agents (dyes and pigments), antistatic agents, electrical conducting agents, crystallization nucleating agents, crystallization promoters, plasticizers, ready-sliding agents, lubricants, mould release agents, flame retardants and flame retarding auxiliaries, etc.

Preferably the plastic film laminate of the invention is used such that the face of the higher moisture permeability (or second plastic film layer) is on the side on which water droplet could occur. When used as a packaging the side of the higher moisture permeability is advantageously in the inside.

The plastic film of the present invention is excellent in its moisture permeability and there is little water droplet adhesion, and so it is valuable in particular as film for the preservation of foodstuffs and plants such as flowers, etc.

EXAMPLES

Below, the present invention is explained in more specific terms by means of examples, but it goes without saying that the invention is not to be restricted merely to these examples.

The various properties were measured or evaluated using the following methods.

(1) Moisture Permeability

This was measured under conditions B (40° C., 90% relative humidity) based on JIS Z0208.

(2) Water Droplet Adhesion Test 80 ml of water of temperature 40° C. was introduced into a 100 ml beaker, the mouth of the beaker then covered with the film, and the beaker placed in a refrigerator at 5° C. After 4 hours it was removed, and the state of the film observed for adhering water droplets.

Example 1 Comparative Example 1

After drying Pebax A and B which are polyether-polyamide block copolymers (made by Elf Atochem), a two-layer film was extruded at 200° C. using a multilayering single screw extruder, such that the thickness was $20\mu$ on the Pebax A side and $10\mu$ on the Pebax B side. Pebax A is made of PA-12 blocks and polytetramethylene glycol (PTMG) blocks and has a shore hardness D of 63. Pebax B is made of PA-12 blocks of Mn 2600 and polyethylene glycol (PEG) blocks of Mn 650. The moisture permeability of the film obtained was 700 g/m$^2$/24 h, and when a beaker containing water at 40° C. was covered with this film such that the Pebax B side was on the inside, there was no adhesion of water droplets. In comparison, the moisture permeability of $30\mu$ film comprising only the Pebax A was 660, and in the water droplet adhesion test numerous water droplets were seen on the film. Now, the moisture permeability of $25\mu$ film comprising the Pebax B alone was 2700 g/m$^2$/24 h, and there was absolutely no adhesion of water droplets.

Example 2 Comparative Example 2

Lamination was performed by extruding a $5\mu$ thickness of Pebax C onto a $25\mu$ film of Pebax D made by Elf Atochem. Pebax C is made of PA-12 blocks and PEG blocks and has a shore hardness D of 40. Pebax D is made of PA-12 blocks and PTMG blocks and has a shore hardness D of 70. The moisture permeability of this two-layer laminated film was 300, and in a water droplet adhesion test with the Pebax C side on the inside, no adhesion of water droplets was noted. In comparison, the moisture permeability of $30\mu$ film comprising only the Pebax D was 260, and in the water droplet adhesion test the adhesion of numerous water droplets was noted. Further, the moisture permeability of $25\mu$ film comprising Pebax C alone was 4300 g/m$^2$/24 h.

Comparative Example 3

10 parts of Pebax C was blended with 90 parts of Pebax D, and then $25\mu$ thickness film formed using a single screw extruder. The moisture permeability of this film was 400, and in the water droplet adhesion test the adhesion of numerous water droplets was noted.

Examples 3 and 4

$30\mu$ thickness films were obtained by performing lamination onto Pebax D film as in Example 2 but employing Hytrel 4767 (thermoplastic polyester elastomer made by DuPont) or Toyobo Urethane E3080A (made by Toyobo) instead of the Pebax C (Examples 3 and 4 respectively). The Hytrel and Toyolo films alone have moisture permeability above 1000 g/m$^2$/24 h. The moisture permeability was 270 and 280 g/m$^2$/24 h respectively, and in neither case were water droplets seen in the water droplet adhesion test.

Example 5

Co-extrusion of a $28\mu$ thickness urethane/Pebax two-layer film was carried out in the same way as in Example 1 except that Toyobo Urethane A3064D was used instead of the Pebax A in Example 1 but has the same moisture permeability. The moisture permeability of this film was 600 g/m$^2$/24 h, and no adhering water droplets were noted.

As explained above, the plastic film of the present invention has a suitable degree of moisture permeability and low water droplet adhesion characteristics, and so when fruit, vegetables or flowers, etc, are wrapped therein and kept at low temperatures, very little fogging of the film by water droplets may be expected.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. An antifogging plastic film laminate for packaging product by wrapping comprising a first moisture permeable plastic film layer having a moisture permeability, as prescribed in JIS Z0208, of less than 1000 g/m$^2$/24 h, and a second moisture permeable plastic film layer having a moisture permeability at least 1000 g/m$^2$/24 h; said first plastic film laver having an outer packaging surface, and said second plastic film layer having an inner packaging surface; wherein the inner packaging surface resists fogging due to water droplet adhesion when product is wrapped therein.

2. The plastic film laminate of claim 1, wherein the first and second plastic film layers comprise at least one material selected from the group consisting of polyether-polyamide block copolymers, thermoplastic polyester elastomers and thermoplastic polyurethanes.

3. The plastic film laminate according to claim 1, wherein the first plastic layer has a moisture permeability in the range of from 10 g/m$^2$/24 h to 900 g/m$^2$/24 h.

4. The plastic film laminate according to claim 3, wherein the first layer has a moisture permeability in the range of from 50 g/m$^2$/24 h to 800 g/m$^2$/24 h.

5. An antifogging plastic film laminate for packaging product by wrapping consisting essentially of a first moisture permeable plastic film layer having a moisture permeability, as prescribed in JIS Z0208, of less than 1000 g/m$^2$/24 h, and a second moisture permeable plastic film layer having a moisture permeability at least 1000 g/m$^2$/24 h; said first plastic layer having an outer packaging surface, and said second plastic layer having an inner packaging surface; wherein the inner packaging surface resists fogging due to water droplet adhesion when product is wrapped therein.

* * * * *